United States Patent
Adenau et al.

(10) Patent No.: US 8,452,426 B2
(45) Date of Patent: May 28, 2013

(54) LIGHTING CONTROL CONSOLE FOR CONTROLLING A LIGHTING SYSTEM

(75) Inventors: Michael Adenau, Würzburg (DE); Hartmut Cordes, Bremen (DE)

(73) Assignee: MA Lighting Technology GmbH, Waldbuttelbrunn (DE)

( * ) Notice: Subject to any disclaimer, the term of this patent is extended or adjusted under 35 U.S.C. 154(b) by 350 days.

(21) Appl. No.: 12/829,431

(22) Filed: Jul. 2, 2010

(65) Prior Publication Data
US 2012/0004745 A1    Jan. 5, 2012

(51) Int. Cl.
G05B 15/00    (2006.01)

(52) U.S. Cl.
USPC .............................. 700/83; 386/231; 315/312

(58) Field of Classification Search
USPC .............................. 700/83; 386/231; 315/312
See application file for complete search history.

(56) References Cited

U.S. PATENT DOCUMENTS

| | | | |
|---|---|---|---|
| 7,809,448 B2 * | 10/2010 | Lys et al. ........................ | 700/12 |
| 2002/0159270 A1 * | 10/2002 | Lynam et al. ................. | 362/492 |
| 2004/0160199 A1 * | 8/2004 | Morgan et al. ................ | 315/312 |
| 2007/0035707 A1 * | 2/2007 | Margulis ....................... | 353/122 |
| 2007/0061023 A1 * | 3/2007 | Hoffberg et al. ................ | 700/83 |
| 2007/0086754 A1 * | 4/2007 | Lys et al. ....................... | 386/128 |
| 2007/0109807 A1 * | 5/2007 | Lynam et al. .................. | 362/545 |
| 2007/0291483 A1 * | 12/2007 | Lys ................................ | 362/227 |
| 2008/0131010 A1 * | 6/2008 | Wilensky ...................... | 382/238 |

* cited by examiner

Primary Examiner — Mohammad Ali
Assistant Examiner — Anthony Whittington
(74) Attorney, Agent, or Firm — Quarles & Brady LLP

(57) ABSTRACT

A lighting control console for controlling a lighting system, wherein digital adjustment commands are generated in the lighting control console and can be transmitted to the lighting devices of the lighting system via data connections includes at least one digital processor and at least one digital memory for generating, managing and storing the adjustment commands, and at least one display unit. Graphical elements can be displayed graphically for the operator at the display unit on a display surface. The display unit is made of an at least partially transparent material in the region of the display surface, wherein the display unit can be switched between a transparency mode and a display mode, and wherein the display unit (06) is partially transparent upon activation of the transparency mode in the region of the display surface and enables the operator to look through the display surface. The display unit enables the graphical representation of graphical elements on the display surface for the operator upon activation of the display mode in the region of the display surface.

18 Claims, 4 Drawing Sheets

LIGHTING CONTROL CONSOLE FOR CONTROLLING A LIGHTING SYSTEM

CROSS REFERENCE TO RELATED APPLICATION

Not applicable.

STATEMENT REGARDING FEDERALLY SPONSORED RESEARCH OR DEVELOPMENT

Not applicable.

FIELD OF THE INVENTION

The invention concerns a lighting control console for controlling a lighting system, wherein digital adjustment commands are generated in the lighting control console and can be transmitted to the lighting devices of the lighting system via data connections. The lighting control console includes at least one digital processor and at least one digital memory for generating, managing and storing the adjustment commands, and at least one display unit. Graphical elements can be displayed graphically for the operator at the display unit on a display surface.

BACKGROUND OF THE INVENTION

Generic lighting control consoles serve the purpose of controlling lighting systems such as are used for example in theaters or else on concert stages. These lighting systems typically include a plurality of lighting devices, for instance stage spotlights, wherein the lighting devices per se may frequently also be switched between a plurality of lighting conditions, for example different colors. In this context, conventional lighting systems may include as many as several thousand lighting devices. In order to be able to control such complex lighting systems, the generic lighting control consoles are equipped with a digital processor that enables digital data and signal processing. For storing the data, provision is also made for a digital memory, in particular making it possible to store lighting programs.

In order to be able to display to the operator the digital data and to thusly enable operation of the lighting control console, the generic lighting control consoles are equipped with a display unit. In the known lighting control consoles, LCD flat screens are typically used for graphically representing the various graphical elements for the operator on the display surface. These known display units intended for lighting control consoles are afflicted with the drawback of intransparency, since during utilization of the lighting control console, particularly during programming of the lighting control console, the operator is frequently required to alternately turn his/her eyes to the lighting system to be programmed, for instance a stage lighting, and to the display surface at the display unit. In this process, it is frequently necessary that the operator changes his/her seating position or even gets up in order to be able to observe the lighting devices beyond the display unit of the lighting control console.

SUMMARY OF THE INVENTION

Based on this prior art, it is consequently an object of the present invention to propose a novel lighting control console that offers greater operator convenience during operation of the lighting control console, particularly during programming of lighting programs. This object is attained by a display unit according to the teachings disclosed herein.

The generic lighting control console is based on the fundamental idea that the display unit intended for the display of graphical elements for the operator is made of an at least partially transparent material. In this regard, during operation of the lighting control console, the display unit can be switched between a transparency mode and a display mode. In this context, the display mode is characterized in that the graphical representation of graphical elements can be displayed in the region of the display surface. In these display regions, the display unit is then largely intransparent.

According to the invention, the transparency mode is characterized in that the display unit is at least partially transparent upon activation of the transparency mode in the region of the display surface and the operator is enabled to look through the display surface.

By way of the inventive utilization of a display unit that can be switched between a transparency mode and a display mode, the operator is provided with the option to observe the regions located behind the display surface, for instance a stage with the lighting devices arranged thereon, through the display surface upon activation of the transparency mode. By switching the display unit into the display mode, the operator in turn is provided with the option to cause graphical elements for operating the lighting control console to be displayed on the display surface. Hence, in other words, due to the aspect that the operator is provided with the option to switch the display unit into a transparency mode, the operator is no longer required to get up or else to change his/her seating position in order to be able to look past the display unit to observe the field of vision lying behind the same.

Various technical options are available for realizing the inventive concept of a display unit that can be switched between a display mode and a transparency mode. According to a first alternative, provision is made for the aspect that the display surface of the display unit is formed by a transparent LED display. By means of correspondingly activating the LED pixels in the display, the pixels may optionally be illuminated in a specific color or may be rendered transparent. By means of controlled activation of different LED pixel regions, graphical elements can optionally be superimposed or else the LED display can be switched into the transparent state.

Alternatively hereto, it is equally conceivable that the display surface of the display unit is formed by the combination of a projection unit with at least one projection surface and at least one projector. In this connection, the projection surface of the projection unit is required to be switchable between a transparent state and an intransparent state. If the projection surface is then switched into the intransparent state, the graphical representations of graphical elements can be projected onto the intransparent projection surface with the aid of the projector.

It is basically conceivable that the projection of the graphical elements is conventionally performed from the front side onto the projection surface, so that the light is reflected at the projection surface and hence is displayed for the operator. However, this type of projection performed from the front side involves the drawback that the light signals need to be guided from the projector to the projection surface through the region in which the hands of the operator for entering operating commands are positioned as well. As a consequence, such a reflected-light projection is frequently shaded by the operator's hands and is therefore disrupted. In avoidance of such a shading effect, it is consequently especially advantageous if the projection is performed from behind onto the side of the projection surface of a projection screen that faces away from the operator. In such a transmitted-light projection, the projector is thus disposed on the side of the projection screen that faces away from the operator. In the light of the aspect that the operator's hands typically are not positioned in this region during utilization of the lighting control console, disruptions due to shading effects are largely precluded. In order to enable such a transmitted-light projection, the projector should be disposed on the rear side of the housing of the lighting control console.

For realizing the inventive concept by utilizing a projection unit, a projection surface is required that can be switched between an intransparent state and a transparent state. Various alternatives are conceivable for realizing such a switchable projection surface. According to a first alternative, the projection surface is made of electro-chromatic glass. By means of varying the control voltage applied to the electro-chromatic glass, the transparency of the electro-chromatic glass can be modified. As a consequence, by way of this measure, it is in each case possible to adjust the transparency of the electro-chromatic glass by varying the control voltage, in such a manner that the operator is either enabled to look through the electro-chromatic glass in the transparency mode or the electro-chromatic glass is switched into the intransparent state and thusly serves as a transmitted-light projection surface.

As an alternative to utilizing an electro-chromatic glass, the projection surface may equally be made of a transparent glass carrier having a transparent film disposed thereon, wherein this film in turn includes a plurality of holographic optical elements (HOE). The holographic optical elements disposed on the transparent film cause a deflection of light, so that the light beam emitted from the projector, which is incident on the holographic optical element, is deflected at a certain angle towards the observer. Light, such as in particular ambient light, that is incident on the holographic optical elements at a different angle is not deflected towards the observer and thusly cannot be spotted on the part of the observer. Thus, by utilizing the holographic optical elements, it is possible to create transmitted-light projection screens suitable for use in daylight.

In order to provide the operator with the option of adjusting the display unit to his/her individual needs, it is especially advantageous if the display unit is mounted at the housing so as to be pivotable about a swivel axis and can be pivoted between a swiveled-back rest position and a swiveled-up operating position, in particular in a continuous fashion. By means of arranging the display unit in the rest position, it is in particular possible to enhance the transportability of the lighting control console. In the rest position, the display unit may fit into the surface of the top of the housing, for instance in a manner complementary in shape. By means of swiveling the display unit upwards into the operating state, conversely, a particularly convenient angle of view on the part of the operator is then enabled for the display unit, since the display unit extends to the top of the housing, for instance at a steep angle. For the purpose of the constructional configuration of the pivotable mounting of the display unit, the display unit may be fastened for instance at a pivotably-mounted carrier element of the housing.

In the simplest embodiment of the pivotable mounting of the display unit, the swiveling motion is manually transferred to the display unit by the operator. For the purpose of further enhancing the operating convenience, however, provision may equally be made for a drive unit that is engaged between housing and display unit and that enables motor-driven displacement of the display unit between rest position and operating position.

As regards construction, the drive unit may be implemented for instance in the form of an electric motor and a gear rim, wherein the electric motor is fastened to the housing of the lighting control console and is in engagement with the gear rim fastened to the display unit. By means of actuating the electric motor, the drive pinion of the gear rim and the display unit fastened thereto can be displaced and hence can be pivoted between rest position and operating position.

In the light of the aspect that the utilization of a transmitted-light projection for displaying the graphical elements presupposes a specific angle to be maintained between projector and projection surface, it is especially advantageous if the projector for projecting the graphical representation is disposed at a portion of the drive unit, in particular at the gear rim, for motor-driven displacement of the display unit. In this way, it is possible to equally displace the projector synchronously thereto upon actuation of the display unit, so that the angle between projector and display surface in each case remains the same.

According to another preferred embodiment, the display surface of the display unit may be formed in the type of a touch-sensitive touch-screen. By means of this measure, the operator is provided with the option of entering operator commands by touching operating elements displayed on the display surface.

Moreover, it is especially advantageous if the operating elements can be displayed on the display surface in a three-dimensional representation, in order to enable a more intuitive operation of the operating elements.

BRIEF DESCRIPTION OF THE DRAWINGS

One embodiment of the invention is schematically illustrated in the drawings and will be exemplarily specified hereinafter.

In the drawings.

DETAILED DESCRIPTION OF THE EXAMPLE EMBODIMENTS

Figure 1:
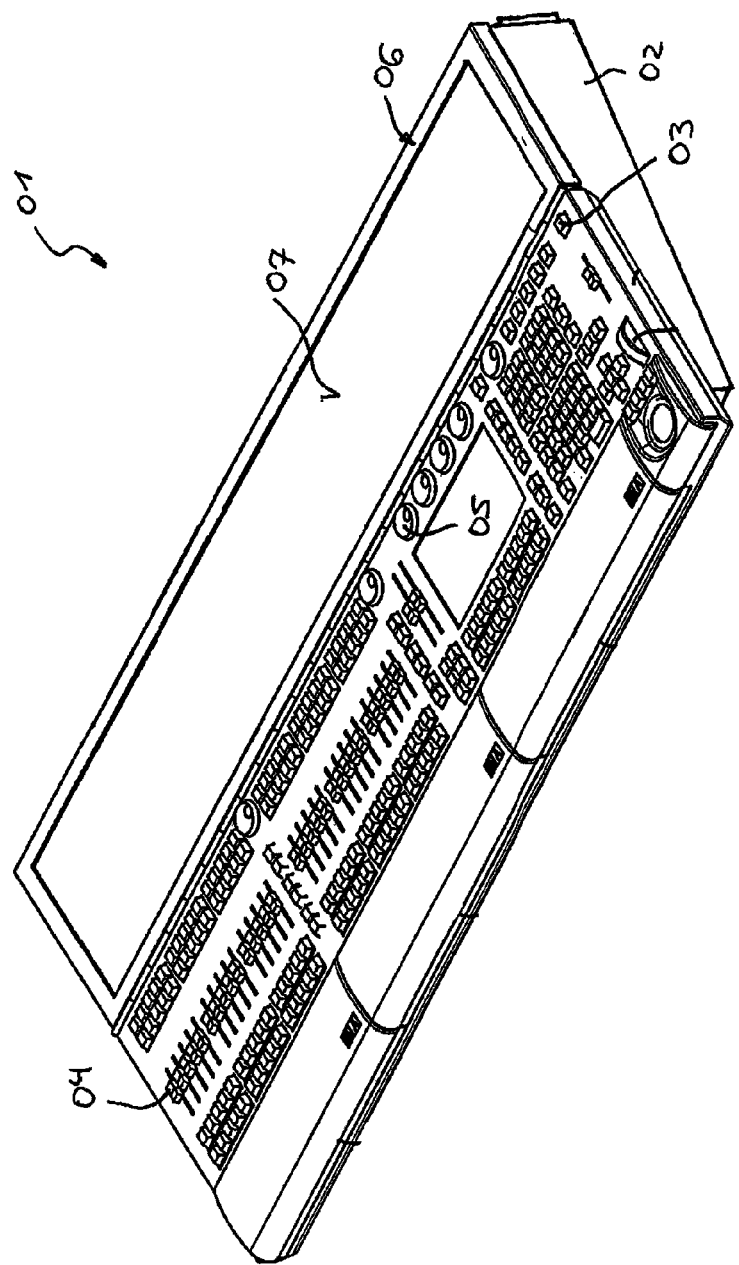
FIG. 1 illustrates a top perspective view of a lighting control console with a display unit arranged in the rest position.
Figure 2:
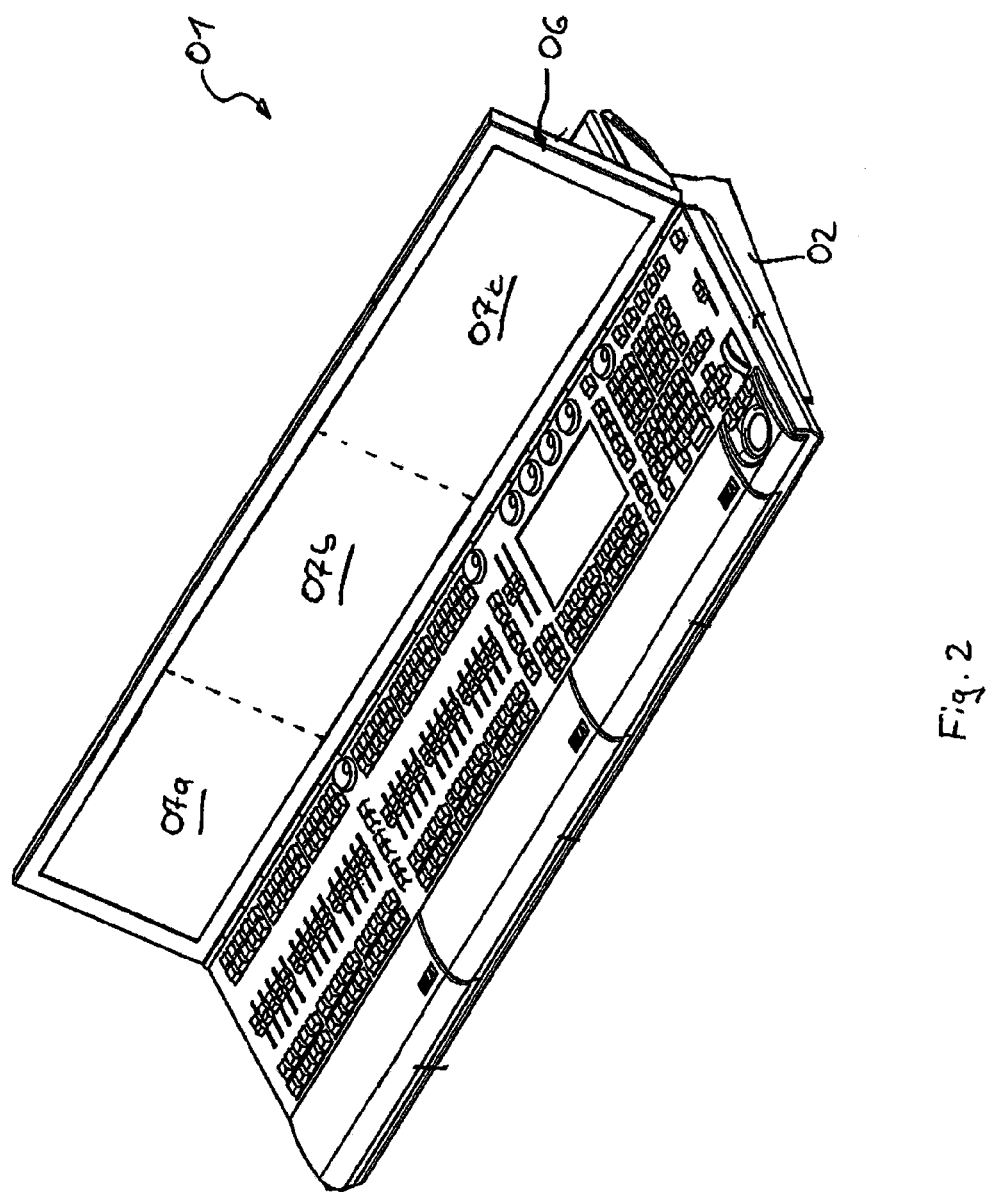
FIG. 2 illustrates the lighting control console according to FIG. 1 after displacement of the display unit into the swiveled-up operating position.
Figure 3:
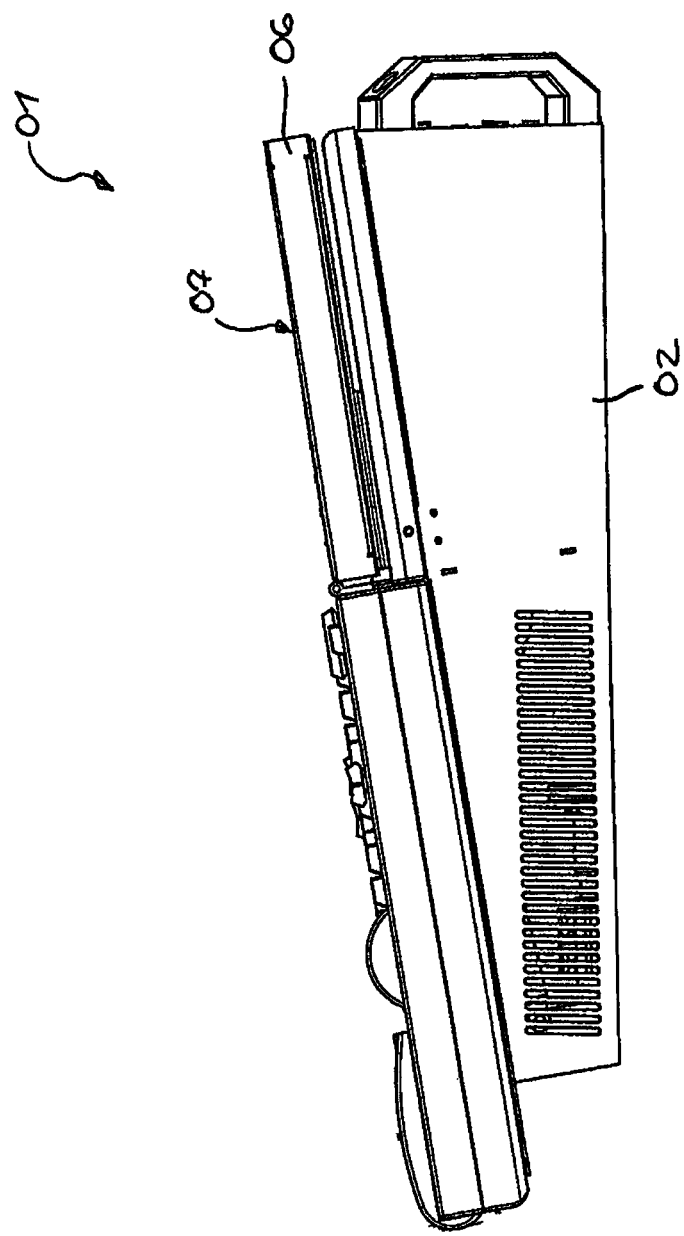
FIG. 3 illustrates a lateral view of the lighting control console according to FIG. 1.

FIG. 1 shows a lighting control console 01 for controlling a complex lighting system. Here, the housing 02 contains a plurality of digital processors and digital memories for generating, transmitting and storing digital adjustment commands. A large number of control elements, particularly buttons 03, slide controls 04 and rotary knobs 05, are arranged on the top of the housing 02. The lighting control console 01 is likewise equipped with a display unit 06 pivotably mounted at the housing 02. The display unit 06 here comprises a display surface 07 that can be switched between a transparent transparency mode and an intransparent display mode. In this context, the display surface 07 of the display unit 06 is formed by a projection unit, i.e. the display surface 07 serves as projection surface, a transmitted-light projector 08 (see FIG. 4) projecting graphical elements onto the rear side thereof. In order to make it possible to cover the entire surface of the display unit 06, here a total of three projectors 08 are utilized, making it possible to respectively project one region of the display surface 07a, 07b and 07c.

Here, the display surface 07 that serves as projection surface is made of an electro-chromatic glass having a transparency that can be varied by applying a control voltage. If an appropriate control voltage is applied in the transparency mode, the display surface 07 is hence largely rendered transparent and enables the operator to look through in order to observe the regions located behind. In the display mode, the control voltage is then varied in such a manner that the display surface 07 is rendered intransparent and the graphical elements projected by the projector 08 can be perceived on the display surface 07.

Figure 4:
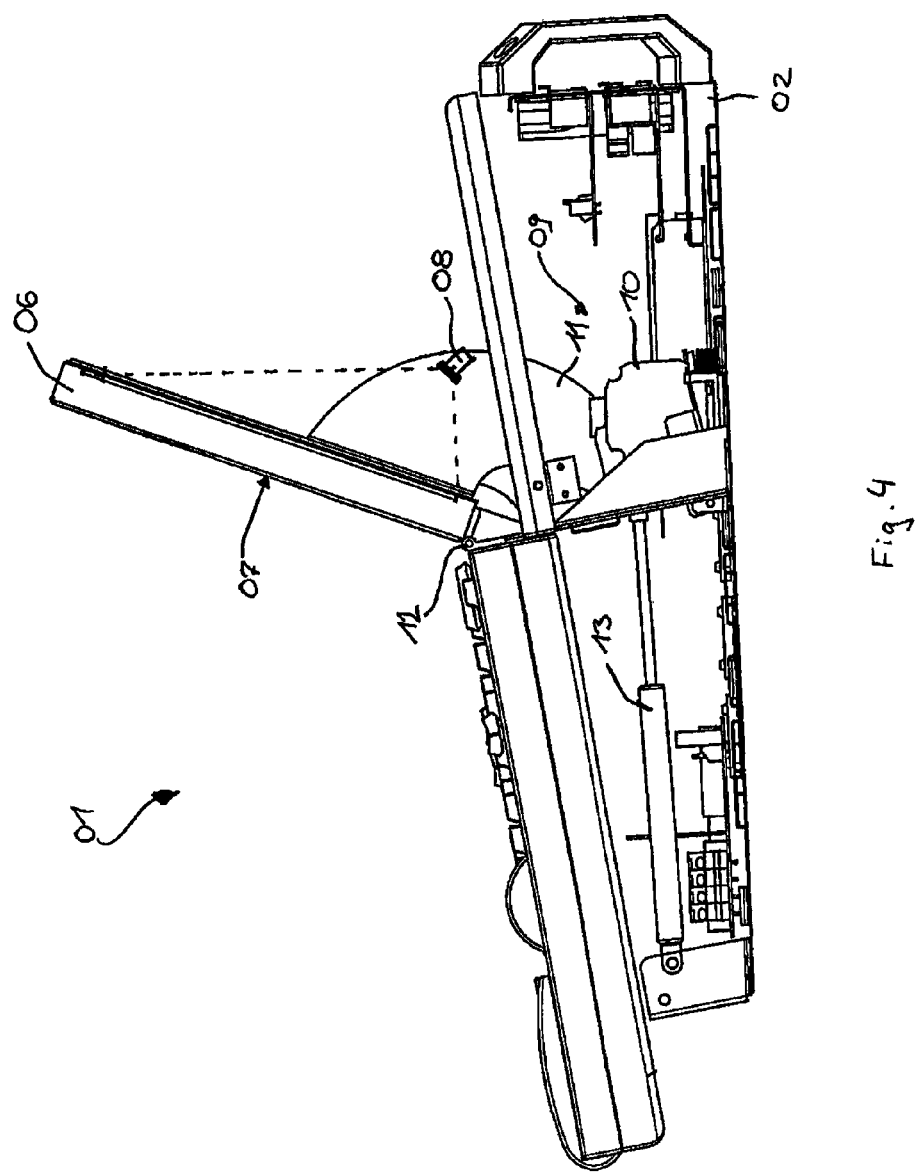
FIG. 4 illustrates the lighting control console according to FIG. 3 with a display unit swiveled-up into the operating position.

FIG. 4 shows the interior of the lighting control console 01 with the display unit 06 in the swiveled-up position. In addition to the digital processors and digital memories, the interior of the housing 02 includes a drive unit 09 for motor-driven displacement of the display unit 06. The drive unit 09 is essentially composed of an electric motor 10 being rigidly connected with the housing 02 and having a drive pinion in engagement with the toothed gearing of a gear rim 11. Here, the toothed gearing of the gear rim 11 is not illustrated in FIG. 4. The upper end of the gear rim 11 is fastened at the bottom of the display unit 06 and pivots about a swivel axis 12 jointly with the display unit 06. On the side of the gear rim 11, the projection units 08 are fastened, so that the same are synchronously swiveled upwards upon displacement of the display unit 06, and the projection angle thereby cannot be varied upon displacement of the display unit 06.

In order to compensate for the restoring forces caused by the display unit 06 as a function of the displacement angle, a gas pressure spring 13 serves as a weight-adjustment element. The two ends of the gas pressure spring 13 here extend between the housing 02 on the one hand and the gear rim 11 on the other hand.

The invention claimed is:

1. A lighting control console for controlling a lighting system, wherein digital adjustment commands are generated in the lighting control console and are transmitted to the lighting devices of the lighting system via data connections, and wherein the lighting control console comprises:
   at least one digital processor and at least one digital memory for generating, managing and storing the adjustment commands; and
   at least one display unit including a display surface made of an at least partially transparent material, wherein the display unit is switchable between a transparency mode and a display mode, and wherein in the transparency mode, the display unit is at least partially transparent in a region of the at least partially transparent material of the display surface allowing an operator to look through the display surface, and wherein in the display mode, the display unit displays graphical elements on the display surface, wherein the at least one display unit is formed by a projection unit having at least one projector and at least one projection surface including the display surface, wherein the at least one projection surface is switchable between a transparent state and an intransparent state, and wherein when the projection surface is switched into the intransparent state, the graphical elements are projected onto the at least one projection surface by the at least one projector.

2. The lighting control console according to claim 1, wherein the display surface of the at least one display unit is formed by a transparent LED display.

3. The lighting console according to claim 1, wherein graphical elements are projected by the at least one projector from behind onto a side of the projection surface that faces away from an operator viewing the display surface.

4. The lighting console according to claim 3, wherein the at least one projector is disposed on a rear side of a housing of the lighting control console.

5. The lighting console according to claim 1, wherein the at least one projection surface is electro-chromatic glass having a transparency that is modifiable by varying the electrical voltage applied.

6. The lighting console according to claim 1, wherein the at least one projection surface is a transparent glass carrier having a transparent film disposed thereon, wherein the film includes a plurality of holographic optical elements (HOE), and wherein each holographic optical element (HOE) deflects light passing through the film and the glass carrier.

7. The lighting console according to claim 1, wherein the display unit is mounted relative to housing so as to be pivotable about a swiveling axis and is pivotable between a swiveled-back rest position and a swiveled-up operating position.

8. The lighting console according to claim 7, wherein a drive unit is engaged between the housing and the display unit for enabling motor-driven displacement of the display unit between the rest position and the operating position.

9. The lighting console according to claim 8, wherein the drive unit comprises a gear rim fastened to the display unit and an electric motor fastened to the housing, wherein the drive pinion of the electric motor is in engagement with toothed gearing of the gear rim.

10. The lighting console according to claim 8, wherein the at least one projector for projecting the graphical elements onto the at least one projection surface is disposed at a portion of the drive unit for motor-driven displacement of the at least one display unit and is displaced synchronously with the display unit upon actuation of the display unit.

11. The lighting control console according to claim 10, wherein the at least one projector for projecting the graphical elements onto the at least one projection surface is disposed at a gear rim of the drive unit.

12. The lighting control console according to claim 1, wherein the display surface of the at least one display unit is a touch-sensitive touch-screen, wherein operator inputs are entered by touching operating elements displayed on the display surface.

13. The lighting control console according to claim 1, wherein the graphical elements are displayed on the display surface in a three-dimensional representation.

14. A lighting control console for controlling a lighting system including lighting devices, said lighting control console comprises:
   a display unit including a display surface, wherein the display unit is switchable between a transparency mode and a display mode, and wherein in the transparency mode, the lighting devices are at least partially viewable through the display surface, and wherein in the display mode, the display unit displays graphical elements on the display surface and at least partially blocks a view of the lighting devices, wherein the display surface includes a transparent glass carrier having a transparent film disposed thereon, wherein the film includes a plurality of holographic optical elements (HOE), and wherein each holographic optical element (HOE) deflects the light passing through the film and the glass carrier.

15. The lighting control console according to claim 14, wherein the display surface of the display unit is a transparent LED display.

16. The lighting console according to claim 14, wherein the display surface includes electro-chromatic glass having a transparency that is modifiable by varying the electrical voltage applied.

17. The lighting console according to claim 14, wherein the display unit includes at least one projector that projects the graphical elements onto the display surface of the display unit.

18. The lighting console according to claim 14, wherein the display unit is mounted as to be pivotable about a swiveling axis and is pivotable between a swiveled-back rest position and a swiveled-up operating position.

* * * * *